(12) United States Patent
Leng

(10) Patent No.: US 12,396,568 B2
(45) Date of Patent: Aug. 26, 2025

(54) ASSEMBLY STRUCTURE FOR BED COLUMN AND BED GUARD

(71) Applicant: Luhao Leng, Xiamen (CN)

(72) Inventor: Luhao Leng, Xiamen (CN)

( * ) Notice: Subject to any disclaimer, the term of this patent is extended or adjusted under 35 U.S.C. 154(b) by 102 days.

(21) Appl. No.: 17/967,231

(22) Filed: Oct. 17, 2022

(65) Prior Publication Data

US 2023/0397739 A1    Dec. 14, 2023

(30) Foreign Application Priority Data

May 19, 2022 (CN) .......................... 202221205928.X

(51) Int. Cl.
*A47C 21/08* (2006.01)
*F16B 12/60* (2006.01)

(52) U.S. Cl.
CPC .............. *A47C 21/08* (2013.01); *F16B 12/60* (2013.01)

(58) Field of Classification Search
None
See application file for complete search history.

(56) References Cited

U.S. PATENT DOCUMENTS

| 187,892 | A | * | 2/1877 | Olney | ..................... | A47C 23/06 |
| | | | | | | 5/236.1 |
| 4,597,472 | A | * | 7/1986 | Hjelm | ..................... | E04G 7/302 |
| | | | | | | 403/348 |
| 4,870,711 | A | * | 10/1989 | Felix | ..................... | A47C 19/005 |
| | | | | | | 403/205 |
| 10,349,751 | B2 | * | 7/2019 | Leng | ..................... | A47C 19/02 |
| 2018/0372138 | A1 | * | 12/2018 | Li | ..................... | A47C 19/20 |

FOREIGN PATENT DOCUMENTS

| BR | MU8501148 | U | * | 1/2007 | ............. | A47C 19/20 |
| DE | 202006008525 | U1 | * | 8/2006 | ........... | A47C 23/002 |

* cited by examiner

*Primary Examiner* — Adam C Ortiz
(74) *Attorney, Agent, or Firm* — Cooper Legal Group, LLC

(57) ABSTRACT

An assembly structure for a bed column and a bed guard is provided. The bed guard comprises a lateral guardrail unit and a longitudinal guardrail unit. A side of the longitudinal guardrail unit comprises a longitudinal guardrail side pipe arranged vertically, and a bottom of the longitudinal guardrail side pipe is inserted into the bed column from top to bottom. A side of the lateral guardrail unit comprises a lateral guardrail frame edge arranged vertically and abutting the longitudinal guardrail side pipe and an upper part of the bed column. A lower position of the lateral guardrail frame edge is locked with an upper bolt and a lower bolt separated from each other in a vertical direction, and the upper bolt and the lower bolt enable the lateral guardrail frame edge, the bed column, and the longitudinal guardrail side pipe to be locked together.

11 Claims, 5 Drawing Sheets

ASSEMBLY STRUCTURE FOR BED COLUMN AND BED GUARD

RELATED APPLICATIONS

This application claims priority to Chinese patent application number 202221205928.X, filed on May 19, 2022. Chinese patent application number 202221205928.X is incorporated herein by reference.

FIELD OF THE DISCLOSURE

The present disclosure relates to an assembly structure for a bed column and a bed guard, and in particular to an assembly structure for a bed column and a bed guard of a double-layer iron frame bed.

BACKGROUND OF THE DISCLOSURE

An upper bunk of a double-layer iron frame bed is relatively high, so guardrails need to be installed around the upper bunk. The existing guardrail installation structure directly inserts or locks the guardrails with frame rods around the upper bunk. Therefore, when assembling, the frame rods around the upper bunk are first installed to form a bed frame of the upper bunk. For example, the frame rods and columns are first connected together, and the guardrails are then connected to the frame rods.

The existing guardrail installation method is to assemble the columns and the frame rods first. That is, the frame rods are first connected to the columns, and then the frame rods and the guardrails are assembled together, which not only has many assembly steps, but also the guardrails are simply connected to the frame rods so as to lack a good firmness.

BRIEF SUMMARY OF THE DISCLOSURE

The present disclosure provides an assembly structure for a bed column and a bed guard, which has good stability and is convenient for an assembly operation. A first technical solution of the present disclosure to solve the technical problem is as follows.

An assembly structure for a bed column and a bed guard is provided. The bed column is vertically arranged. The bed guard comprises a lateral guardrail unit and a longitudinal guardrail unit. A side of the longitudinal guardrail unit comprises a longitudinal guardrail side pipe arranged vertically, and a bottom of the longitudinal guardrail side pipe is inserted into the bed column from top to bottom. A side of the lateral guardrail unit comprises a lateral guardrail frame edge arranged vertically, and the lateral guardrail frame edge abuts an outer side of the longitudinal guardrail side pipe and an outer side of an upper part of the bed column. A lower position of the lateral guardrail frame edge is locked with an upper bolt and a lower bolt that are separated from each other in a vertical direction, and the upper bolt and the lower bolt enable the lateral guardrail frame edge, the bed column, and the longitudinal guardrail side pipe to be locked together.

After the longitudinal guardrail side pipe of the longitudinal guardrail unit is inserted into the bed column, the lateral guardrail frame edge of the lateral guardrail unit directly abuts the longitudinal guardrail side pipe and the bed column. The lateral guardrail frame edge, the bed column, and the longitudinal guardrail side pipe are firmly locked together through the upper bolt and the lower bolt, so that the bed column and the bed guard form an integral structure, which can support each other and improves stability. The assembly process can be quickly completed by directly screwing the upper bolt and lower bolt, and the assembly operation is very convenient.

In a preferred embodiment, a bottom edge of the lateral guardrail unit comprises a lateral frame rod horizontally, laterally arranged, an end of the lateral frame rod is connected to the lateral guardrail frame edge, and the upper bolt and the lower bolt are respectively located on an upper side and a lower side of the lateral frame rod. The lateral frame rod can be directly used as a bed frame of a double-layer iron frame bed, and there is no need to install the bed frame separately. The structure is simpler, and the assembly process is reduced.

In a preferred embodiment, a bottom edge of the longitudinal guardrail unit comprises a longitudinal frame rod horizontally arranged, and an end of the longitudinal frame rod is connected to the longitudinal guardrail side pipe. The longitudinal frame rod can be directly used as the bed frame of a double-layer iron frame bed, and there is no need to install the bed frame separately. The structure is simpler, and the assembly process is reduced.

In a preferred embodiment, a top surface of the longitudinal frame rod comprises a plurality of buckle holes evenly spaced apart from each other. The plurality of buckle holes can facilitate an installation of frame rods of the double-layer iron frame bed.

In a preferred embodiment, each of the plurality of buckle holes is disposed with a plastic hanging sleeve.

In a preferred embodiment, an inner side of the lateral frame rod is disposed with two or three groove brackets along a length direction of the lateral frame rod. The two or three groove brackets can be used to receive a bridge, which is convenient for installation of the frame rods.

In a preferred embodiment, an upper position of the lateral guardrail frame edge is locked with a reinforcement bolt, and the reinforcement bolt enables the lateral guardrail frame edge and the longitudinal guardrail side pipe to be locked together.

In a preferred embodiment, the longitudinal guardrail side pipe is disposed with pull rivets respectively corresponding to the upper bolt, the lower bolt, and the reinforcement bolt.

In a preferred embodiment, the lateral guardrail frame edge is formed by flattening a hollow circular tube and is arc-shaped. By flattening the hollow circular tube to define the lateral guardrail frame edge, the lateral guardrail frame edge of the lateral guardrail frame edge has better strength, and the arc shape can better attach to the outer side of the bed column and the outer side of the longitudinal guardrail side pipe.

In a preferred embodiment, the assembly structure comprises a plastic cup sleeve, and the plastic cup sleeve is inserted into the upper part of the bed column. An upper flange of the plastic cup sleeve is hung on an upper end surface of the bed column. The bottom of the longitudinal guardrail side pipe is inserted into the plastic cup sleeve. The upper bolt and the lower bolt enable the lateral guardrail frame edge, the bed column, the plastic cup sleeve, and the longitudinal guardrail side pipe to be locked together. The plastic cup sleeve can make the bed column and the longitudinal guardrail side pipe plug more tightly, and further avoid shaking.

DETAILED DESCRIPTION OF THE EMBODIMENTS

The present disclosure will be further described below in combination with the accompanying drawings and embodiments.

Figure 1:
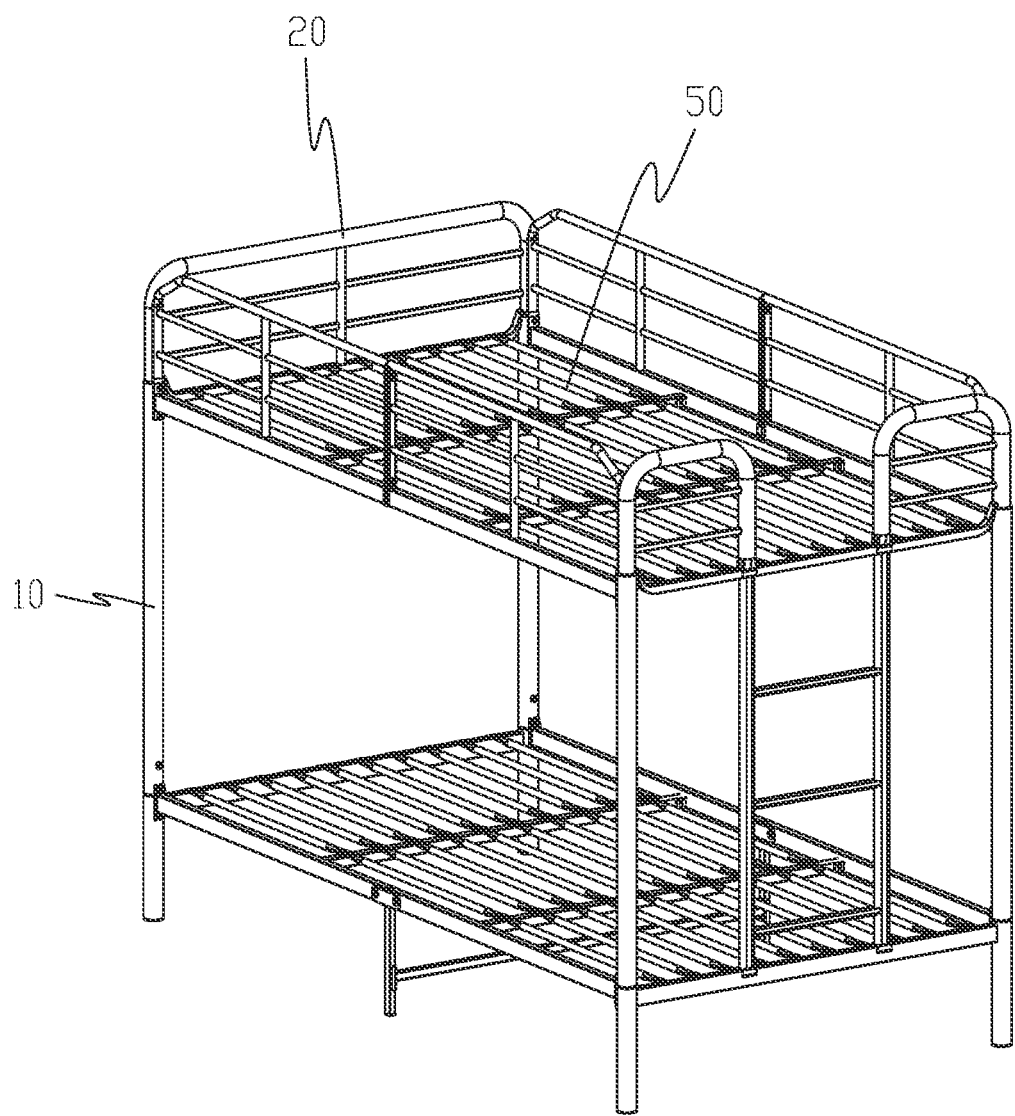
FIG. 1 illustrates a perspective view of a double-layer iron frame bed.
Figure 2:
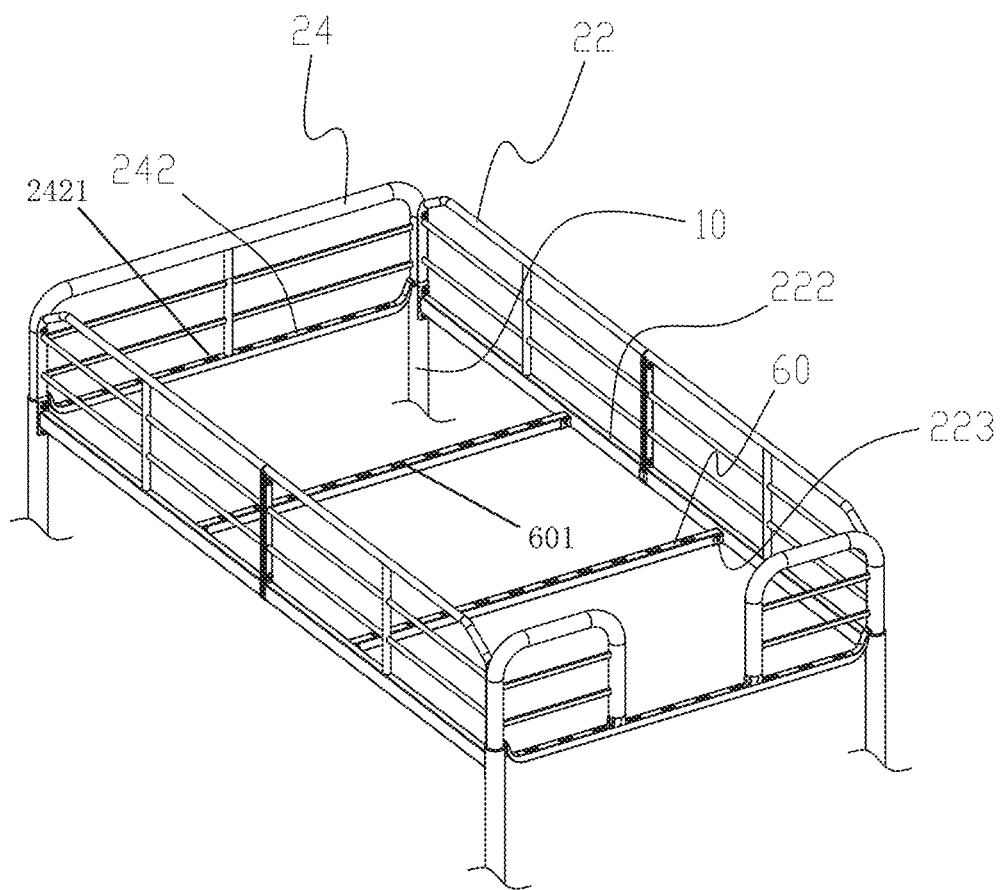
FIG. 2 illustrates a partial perspective view of the double-layer iron frame bed illustrated in FIG. 1.
Figure 3:
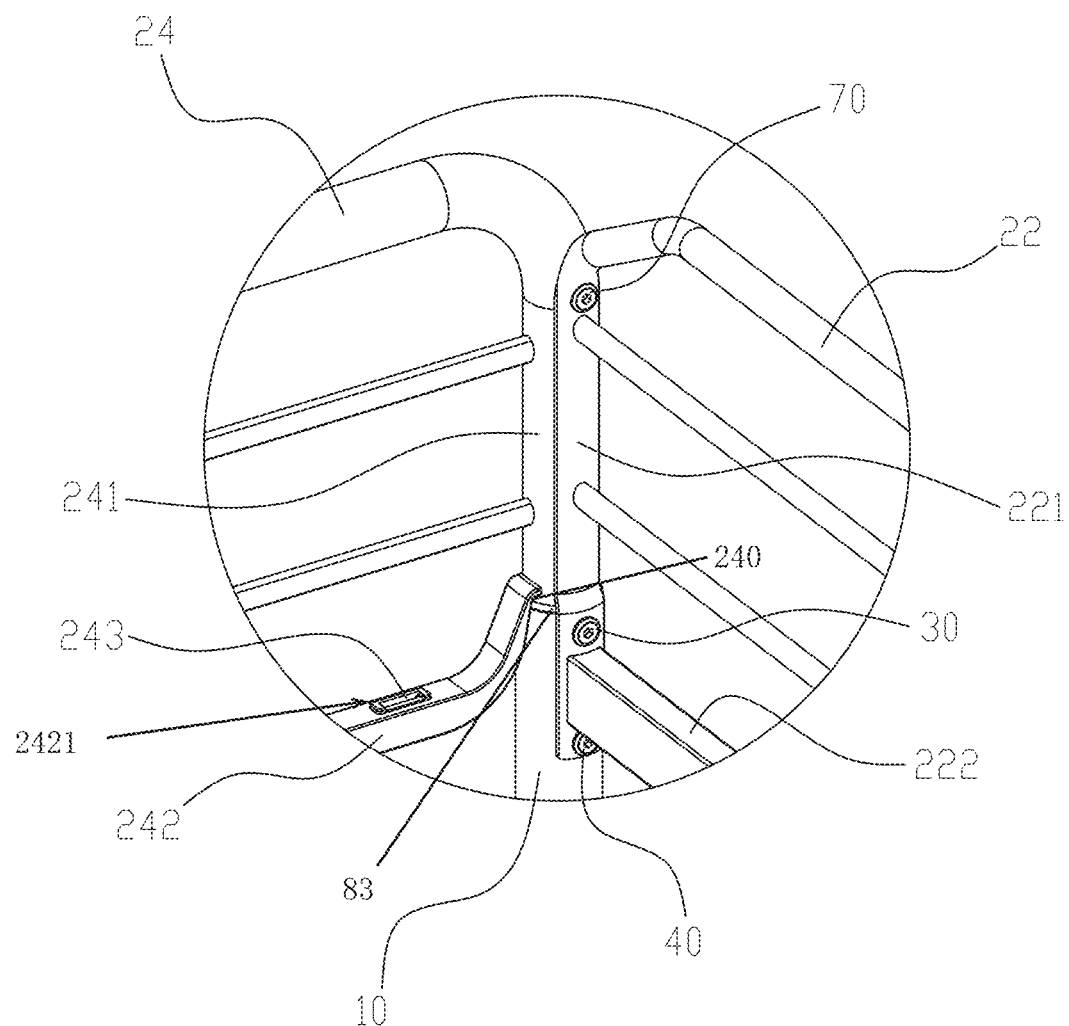
FIG. 3 illustrates an enlarged perspective view of the double-layer iron frame bed illustrated in FIG. 1, illustrating a connection between a bed column and a bed guard.
Figure 4:
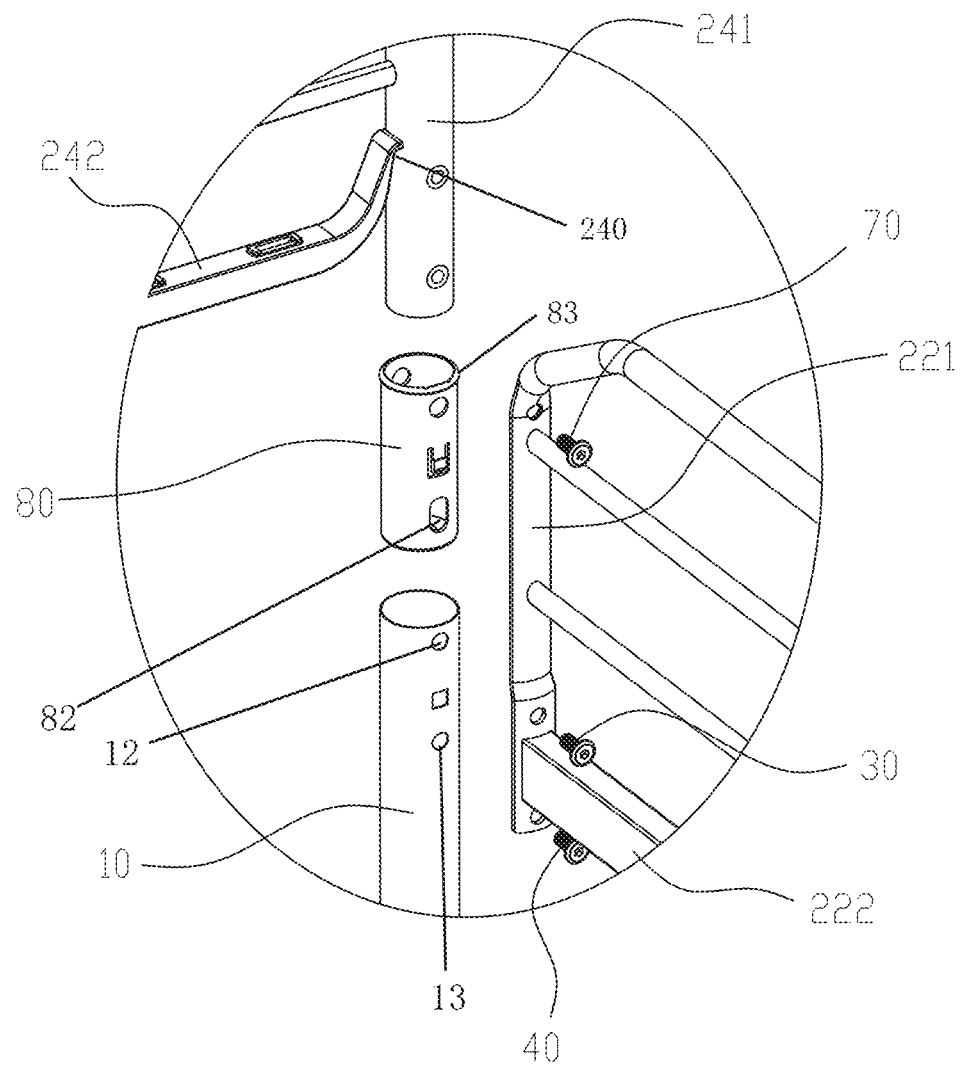
FIG. 4 illustrates an enlarged exploded perspective view of the double-layer iron frame bed illustrated in FIG. 1, illustrating the connection between the bed column and the bed guard.
Figure 5:
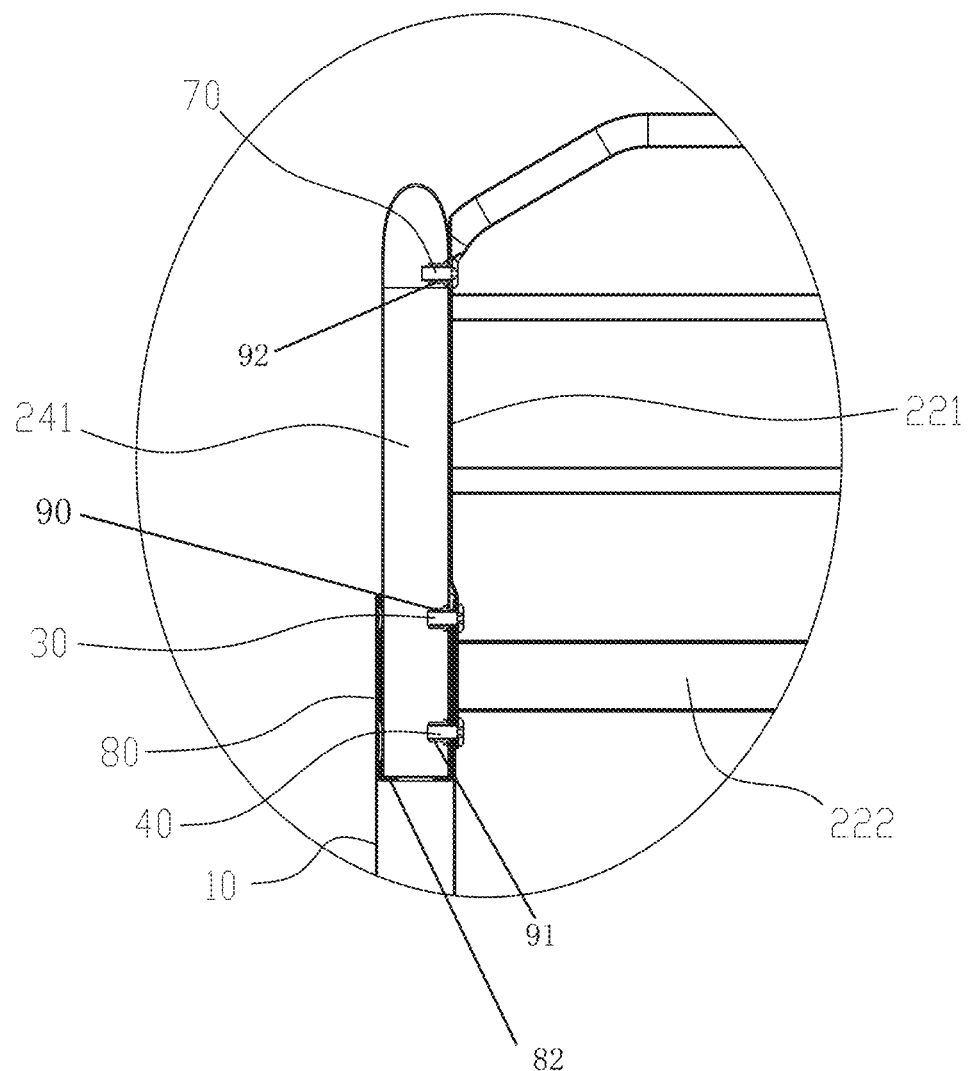
FIG. 5 illustrates an enlarged cross-sectional perspective view of the double-layer iron frame bed illustrated in FIG. 1, illustrating the connection between the bed column and the bed guard.

Referring to FIGS. 1 to 5, a double-layer iron frame bed comprises an upper bunk and a lower bunk that are separated from each other by bed columns 10, and all sides of the upper bunk are disposed with a bed guard 20. The bed columns 10 are four bed columns 10 disposed at four corners of the double-layer iron frame bed. The bed guard 20 has four units, which are connected together two by two and are fixed together with the bed columns 10 in a connecting position.

An assembly structure of the bed columns 10 and the bed guard 20 is specifically as follows. The bed columns 10 are arranged vertically, and the bed guard 20 comprises a lateral guardrail unit 22 and a longitudinal guardrail unit 24 that are arranged in a vertical and intersecting arrangement. A side of the longitudinal guardrail unit 24 comprises a longitudinal guardrail side pipe 241 arranged vertically, and a bottom of the longitudinal guardrail side pipe 241 is inserted into a corresponding one of the bed columns 10 from top to bottom. A side of the lateral guardrail unit 22 comprises a lateral guardrail frame edge 221 arranged vertically, and the lateral guardrail frame edge 221 abuts an outer side of the longitudinal guardrail side pipe 241 and an outer side of an upper part of the corresponding one of the bed columns 10. A lower position of the lateral guardrail frame edge 221 is locked with an upper bolt 30 and a lower bolt 40 that are separated from each other in a vertical direction, and the upper bolt 30 and the lower bolt 40 enable the lateral guardrail frame edge 221, the corresponding one of the bed columns 10, and the longitudinal guardrail side pipe 241 to be locked together to form an integral structure.

Preferably, bottom edges of the lateral guardrail units 22 comprise lateral frame rods 222 horizontally, laterally arranged, and an end of each of the lateral frame rods 222 is connected to the lateral guardrail frame edge 221. The upper bolt 30 and the lower bolt 40 are respectively located on an upper side and a lower side of a corresponding one of the lateral frame rods 222. The lateral frame rods 222 can be used to form a lateral bed frame of the upper bunk.

Preferably, a bottom edge of the longitudinal guardrail unit 24 comprises a longitudinal frame rod 242 horizontally arranged, and an end of the longitudinal frame rod 242 is connected to the longitudinal guardrail side pipe 241. The longitudinal frame rod 242 can be used to form a longitudinal bed frame of the upper bunk. Further preferably, a top surface of the longitudinal frame rod 242 comprises a plurality of first buckle holes 2421 evenly spaced apart from each other to facilitate an installation of frame rods 50 of the double-layer iron frame bed. In this embodiment, each of the plurality of first buckle holes 2421 is disposed with a plastic hanging sleeve 243.

Preferably, inner sides of the lateral frame rods 222 are disposed with groove brackets 223 evenly spaced on along a length direction of the lateral frame rods 222, so that a bridge 60 can be connected between two opposite groove brackets 223 of the groove brackets 223, which is also convenient for installation of the frame rods 50. A top surface of the bridge 60 comprises a plurality of second buckle holes 601, and two ends of each of the frame rods 50 are folded downward to be disposed in a corresponding one of the plurality of first buckle holes 2421 and a corresponding one of the plurality of second buckle holes 601.

Preferably, an upper position of the lateral guardrail frame edge 221 is locked with a reinforcement bolt 70, and the reinforcement bolt 70 enables the lateral guardrail frame edge 221 and the longitudinal guardrail side pipe 241 to be locked together.

Preferably, the longitudinal guardrail side pipe 241 comprises an upper pull rivet 90, a lower pull rivet 91, and a reinforcement pull rivet 92 respectively corresponding to the upper bolt 30, the lower bolt 40, and the reinforcement bolt 70, so as to facilitate a locking process of the bolts. The longitudinal guardrail side pipe 241 comprises a straight tube 245, and the upper pull rivet 90 and the lower pull rivet 91 are disposed in the straight tube 245. First ends of the upper bolt 30 and the lower bolt 40 pass through the lateral guardrail frame edge 221, a corresponding one of the bed columns 10, the plastic cup sleeve 80, and a side of the straight tube 245 to be respectively locked to the upper pull rivet 90 and the lower pull rivet 91. Second ends of the upper bolt 30 and the lower bolt 40 are disposed in the straight tube 245 instead of extending out of the straight tube 245. The reinforcement pull rivet 92 is disposed in the straight tube 245, and a first end of the reinforcement bolt 70 passes through the lateral guardrail frame edge 221, the corresponding one of the bed columns 10, the plastic cup sleeve 80, and the side of the straight tube 245 to be locked to the reinforcement pull rivet 92. A second end of the reinforcement bolt 70 is disposed in the straight tube 245 instead of extending out of the straight tube 245.

Preferably, the lateral guardrail frame edge 221 is formed by flattening a hollow circular tube and is arc-shaped. In this embodiment, the lateral guardrail frame edge 221 and a lateral rod of an upper end of the lateral guardrail unit 22 are formed by bending a rigid tube.

Preferably, a plastic cup sleeve 80 is provided. The plastic cup sleeve 80 is inserted into the upper part of the corresponding one of the bed columns 10, and an upper flange 83 of the plastic cup sleeve 80 is hung on an upper end surface of the corresponding one of the bed columns 10. A bottom of the longitudinal guardrail side pipe 241 is inserted into the plastic cup sleeve 80, and the upper bolt 30 and the lower bolt 40 are locked on the plastic cup sleeve 80 together.

The plastic cup sleeve 80 comprises a bottom surface 82, and the longitudinal guardrail side pipe 241 abuts the bottom surface 82. The end of the longitudinal frame rod 242 tapers in a direction adjacent to the longitudinal guardrail side pipe 241 to define a space 240 for receiving the upper flange 83 of the plastic cup sleeve 80. The upper part of the corresponding one of the bed columns 10 comprises an upper hole 12 corresponding to the upper bolt 30 and a lower hole 13 corresponding to the lower bolt 40. Upper ends of upper parts of the bed columns 10 and the plastic cup sleeve 80 are flat.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. An assembly structure for bed columns, bed guards, and frame rods, wherein:
the bed columns are vertically arranged,
the bed guards comprise lateral guardrail units and a longitudinal guardrail unit,
a side of the longitudinal guardrail unit comprises a longitudinal guardrail side pipe arranged vertically,
a bottom of the longitudinal guardrail side pipe is inserted into a corresponding one of the bed columns from top to bottom,
a side of each of the lateral guardrail units comprises a lateral guardrail frame edge arranged vertically,
the lateral guardrail frame edge abuts an outer side of the longitudinal guardrail side pipe and an outer side of an upper part of the corresponding one of the bed columns,
a lower position of the lateral guardrail frame edge is locked with an upper bolt and a lower bolt that are separated from each other in a vertical direction,
the upper bolt and the lower bolt enable the lateral guardrail frame edge, the corresponding one of the bed columns, and the longitudinal guardrail side pipe to be locked together,
the assembly structure comprises a plastic cup sleeve,
the plastic cup sleeve is disposed in the upper part of the corresponding one of the bed columns,
an upper flange of the plastic cup sleeve is hung on an upper end surface of the corresponding one of the bed columns,
the bottom of the longitudinal guardrail side pipe is disposed in the plastic cup sleeve,
the upper bolt and the lower bolt enable the lateral guardrail frame edge, the corresponding one of the bed columns, the plastic cup sleeve, and the longitudinal guardrail side pipe to be locked together,
a bottom edge of the longitudinal guardrail unit comprises a longitudinal frame rod horizontally arranged,
bottom edges of the lateral guardrail units comprise lateral frame rods horizontally arranged,
a top surface of the longitudinal frame rod comprises a plurality of first buckle holes evenly spaced apart from each other,
inner sides of the lateral frame rods are disposed with groove brackets along a length direction of the lateral frame rods,
two ends of a bridge are connected to two opposite groove brackets of the groove brackets,
a top surface of the bridge comprises a plurality of second buckle holes,
two ends of each of the frame rods are folded downward to be disposed in a corresponding one of the plurality of first buckle holes and a corresponding one of the plurality of second buckle holes.

2. The assembly structure for the bed columns, the bed guards and the frame rods according to claim 1, wherein:
one end of the two ends of each of the lateral frame rods is connected to the lateral guardrail frame edge, and the upper bolt and the lower bolt are respectively located on an upper side and a lower side of a corresponding one of the lateral frame rods.

3. The assembly structure for the bed columns, the bed guards and the frame rods according to claim 1, wherein:
an end of the longitudinal frame rod is connected to the longitudinal guardrail side pipe.

4. The assembly structure for the bed columns, the bed guards and the frame rods according to claim 1, wherein:
each of the plurality of first buckle holes and the plurality of second buckle holes is disposed with a plastic hanging sleeve.

5. The assembly structure for the bed columns, the bed guards and the frame rods according to claim 1, wherein:
an upper position of the lateral guardrail frame edge is locked with a reinforcement bolt, and
the reinforcement bolt enables the lateral guardrail frame edge and the longitudinal guardrail side pipe to be locked together.

6. The assembly structure for the bed columns, the bed guards and the frame rods according to claim 5, wherein:
the longitudinal guardrail side pipe comprises an upper pull rivet, a lower pull rivet, and a reinforcement pull rivet respectively corresponding to the upper bolt, the lower bolt, and the reinforcement bolt.

7. The assembly structure for the bed columns, the bed guards and the frame rods according to claim 1, wherein:
the lateral guardrail frame edge is formed by flattening a hollow circular tube and is arc-shaped.

8. The assembly structure for the bed columns, the bed guards and the frame rods according to claim 5, wherein:
the lateral guardrail frame edge is formed by flattening a hollow circular tube and is arc-shaped.

9. The assembly structure for the bed columns, the bed guards and the frame rods according to claim 1, wherein:
upper ends of the upper part of the corresponding one of the bed columns and the plastic cup sleeve are flat.

10. The assembly structure for the bed columns, the bed guards and the frame rods according to claim 6, wherein:
the longitudinal guardrail side pipe comprises a straight tube,
the upper pull rivet and the lower pull rivet are disposed in the straight tube,
first ends of the upper bolt and the lower bolt pass through the lateral guardrail frame edge, the bed columns, the plastic cup sleeve, and a side of the straight tube to be respectively locked to the upper pull rivet and the lower pull rivet, and
second ends of the upper bolt and the lower bolt are disposed in the straight tube instead of extending out of the straight tube.

11. The assembly structure for the bed columns, the bed guards and the frame rods according to claim 10, wherein:
the reinforcement pull rivet is disposed in the straight tube,
a first end of the reinforcement bolt passes through the lateral guardrail frame edge, the bed columns, the plastic cup sleeve, and the side of the straight tube to be locked to the reinforcement pull rivet, and
a second end of the reinforcement bolt is disposed in the straight tube instead of extending out of the straight tube.

* * * * *